(12) United States Patent
Ikeda et al.

(10) Patent No.: US 11,843,669 B2
(45) Date of Patent: Dec. 12, 2023

(54) POSTING LOCATION ORDINARINESS/EXTRAORDINARINESS DETERMINATION SYSTEM

(71) Applicant: NEC Corporation, Tokyo (JP)

(72) Inventors: Keisuke Ikeda, Tokyo (JP); Kazufumi Kojima, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/010,491

(22) PCT Filed: Jun. 18, 2020

(86) PCT No.: PCT/JP2020/024028
§ 371 (c)(1),
(2) Date: Dec. 15, 2022

(87) PCT Pub. No.: WO2021/255909
PCT Pub. Date: Dec. 23, 2021

(65) Prior Publication Data
US 2023/0239357 A1    Jul. 27, 2023

(51) Int. Cl.
*H04L 67/1396* (2022.01)
*H04L 51/52* (2022.01)

(52) U.S. Cl.
CPC .......... *H04L 67/1396* (2022.05); *H04L 51/52* (2022.05)

(58) Field of Classification Search
CPC ............................ H04L 67/1396; H04L 51/52
USPC ....................................................... 709/203
See application file for complete search history.

(56) References Cited

U.S. PATENT DOCUMENTS

| 7,809,805 B2 * | 10/2010 | Stremel | H04W 4/029 705/25 |
| 2013/0086641 A1 * | 4/2013 | Mehr | G06F 21/40 726/4 |
| 2014/0122604 A1 * | 5/2014 | Enoki | H04L 67/52 709/204 |

(Continued)

FOREIGN PATENT DOCUMENTS

| JP | 2014-206792 A | 10/2014 |
| JP | 2017-228169 A | 12/2017 |

(Continued)

OTHER PUBLICATIONS

International Search Report for PCT Application No. PCT/JP2020/024028, dated Aug. 11, 2020.

(Continued)

*Primary Examiner* — Ruolei Zong
(74) *Attorney, Agent, or Firm* — Sughrue Mion, PLLC

(57) ABSTRACT

An acquiring unit acquires information of the residence of one or more second users each having a second social media account related to a first user having a first social media account. An estimating unit estimates the residence of the first user from the information of the residence of the second user. A detecting unit detects a posting area at which the first user has posted on social media. A comparing unit compares the detected posting area with the estimated residence of the first user. A determining unit determines whether the posting area is an ordinary activity area or an extraordinary activity area for the first user based on the result of the comparison.

10 Claims, 13 Drawing Sheets

(56) References Cited

U.S. PATENT DOCUMENTS

| | | | | |
|---|---|---|---|---|
| 2014/0236946 | A1* | 8/2014 | Abhyanker | G06Q 50/01 |
| | | | | 707/737 |
| 2015/0262237 | A1* | 9/2015 | Skiba | H04M 3/5183 |
| | | | | 705/14.58 |
| 2016/0071325 | A1* | 3/2016 | Callaghan | A61M 5/20 |
| | | | | 345/633 |

FOREIGN PATENT DOCUMENTS

| | | |
|---|---|---|
| JP | 2019-045950 A | 3/2019 |
| WO | 2019/234827 A1 | 12/2019 |

OTHER PUBLICATIONS

Yosuke Suzuki, Tomonobu Ozaki "A Fundamental Attempt to Extract Unusual Geo-Tagged Tweets", the 102nd Conference on Knowledge-Based Systems, the Japanese Society for Artificial Intelligence, SIG-KBS-B401-08, 46-50, 2014.

Backstrom, Lars, Eric Sun, Cameron Marlow "Find me if you can: improving geographical prediction with social and (spatial proximity", Proceedings of the 19th international conference on World Wide Web, 2010, pp. 61-70.

* cited by examiner

FIG. 4

$$r'^{l}_{u} = \prod_{(u,v) \in E} \frac{p(|l_u - l_v|)}{1-p(|l_u - l_v|)} \, r^l \qquad (1)$$

$$r^l = \prod_{v \in V} 1-p(|l_u - l_v|) \qquad (2)$$

$$p(|l_u - l_v|) = a(b+|l_u - l_v|)^{-c} \qquad (3)$$

$$r'^{l}_{u} = \prod_{(u,v) \in E} \left[\frac{p(|l_u - l_v|)}{1-p(|l_u - l_v|)}\right]^{W_v} r^l \qquad (4)$$

$$W_v = \begin{cases} 1.0 & \text{if v is an online friend,} \\ \omega & \text{if v is an offline friend.} \end{cases} \qquad (5)$$

POSTING LOCATION ORDINARINESS/EXTRAORDINARINESS DETERMINATION SYSTEM

This application is a National Stage Entry of PCT/JP2020/024028 filed on Jun. 18, 2020, the contents of all of which are incorporated herein by reference, in their entirety.

TECHNICAL FIELD

The present invention relates to a posting location ordinariness/extraordinariness determination system, a posting location ordinariness/extraordinariness determination method, and a recording medium.

BACKGROUND ART

With the spread of the Internet and smartphones, services called social media such as Twitter, Facebook, YouTube and Instagram appeared and have been actively used. A wide variety of content is posted on the social media, from everyday casual tweets to impressions of recent hot news.

One of the criteria for classifying posts on the social media by users is extraordinariness. Extraordinariness means being far from normal life. Extraordinariness is further divided into extraordinariness in terms of area, extraordinariness in terms of time, and extraordinariness in terms of content. Extraordinariness in terms of area means being far from a usual activity area. Extraordinariness in terms of time means being far from a usual posting time. Extraordinariness in terms of content means being far from usually posted content. In the present invention, focusing on the extraordinariness in terms of area, a post on the social media by a user is considered as an ordinary post when it is at a usual activity area, and is considered as an extraordinary post when it is at an area away from the usual activity area. In the following description, when simply referred to as an extraordinary post, it means a post at an area away from a usual activity area.

Non-Patent Document 1 describes an example of a technique for determining whether or not a user's post on the social media is an extraordinary post. In the technique described in Non-Patent Document 1 (hereinafter referred to as a first related technique), the extraordinariness in terms of area of a certain tweet t by a user u is defined as the sum of the distances between the posting area of the tweet t and the posting areas of other tweets by the user u. That is to say, in the first related technique, a tweet posted at an area away from areas where tweets are ordinarily posted is determined to be an extraordinary tweet.

Patent Document 1: WO2019/234827A1
Non-Patent Document 1: Yosuke SUZUKI, Tomonobu OZAKI "A Fundamental Attempt to Extract Unusual Geo-Tagged Tweets", the $102^{nd}$ Conference on Knowledge-Based Systems, the Japanese Society for Artificial Intelligence, SIG-KBS-B401-08, 46-50, 2014
Non-Patent Document 2: Backstrom, Lars, Eric Sun, Cameron Marlow "Find me if you can: improving geographical prediction with social and spatial proximity", Proceedings of the 19th international conference on World Wide Web, 2010, pp. 61-70

However, the first related technique is based on the premise that a user tweets in his/her daily life. Therefore, in the case of a user who does not tweet frequently in his/her daily life, it is difficult to determine whether or not the tweet is an extraordinary tweet. For example, in the case of a user who has posted a small number of tweets, or in the case of a user who has posted many tweets at a variety of areas, it is difficult to identify the daily living sphere of the user from the posting area, and therefore, it is difficult to determine whether or not the tweet is an extraordinary one. Moreover, in the case of a user who posts during an extraordinary event such as travel but rarely posts in his/her usual activity area, it is difficult to identify the daily living sphere of the user from the posting area, and therefore, it is difficult to determine whether or not the tweet is an extraordinary one.

SUMMARY

An object of the present invention is to provide a posting location ordinariness/extraordinariness determination system that solves the abovementioned problem, that is, a problem of difficult in determining whether or not a post by a user who rarely posts in his/her daily life is an extraordinary post.

A posting location ordinariness/extraordinariness determination system as an aspect of the present invention includes: a first acquiring unit configured to acquire information of a residence of one or more second users each having a second social media account related to a first user having a first social media account; an estimating unit configured to estimate a residence of the first user from the information of the residence of the second user; a detecting unit configured to detect a posting area at which the first user has posted on social media; a first comparing unit configured to compare the posting area with the residence of the first user; and a first determining unit configured to determine whether the posting area is an ordinary activity area or an extraordinary activity area for the first user based on a result of the comparison.

Further, a posting location ordinariness/extraordinariness determination method as another aspect of the present invention includes: acquiring information of a residence of one or more second users each having a second social media account related to a first user having a first social media account; estimating a residence of the first user from the information of the residence of the second user; detecting a posting area at which the first user has posted on social media; comparing the posting area with the residence of the first user; and determining whether the posting area is an ordinary activity area or an extraordinary activity area for the first user based on a result of the comparison.

Further, on a non-transitory computer-readable recording medium as another aspect of the present invention, a computer program is recorded. The computer program includes instructions for causing a computer to execute processes to: acquire information of a residence of one or more second users each having a second social media account related to a first user having a first social media account; estimate a residence of the first user from the information of the residence of the second user; detect a posting area at which the first user has posted on social media; compare the posting area with the residence of the first user; and determine whether the posting area is an ordinary activity area or an extraordinary activity area for the first user based on a result of the comparison.

With the configurations as described above, the present invention enables determination whether or not a post by a user who rarely post in his/her daily life is an extraordinary post.

BRIEF DESCRIPTION OF DRAWINGS

FIG. 4 is a figure showing an example of equations used when estimating the residence of a target user from the residence of a related user;

EXAMPLE EMBODIMENTS

Next, example embodiments of the present invention will be described in detail with reference to the drawings. Below, the example embodiments of the present invention will be described using an SNS (Social Networking Service) as an example of the social media. However, the present invention is not limited to the SNS only, and can be applied to general social media including messaging services such as chat, blogs, electronic bulletin boards, video sharing sites, information sharing sites, social games, and social bookmarks.

First Example Embodiment

Figure 1:
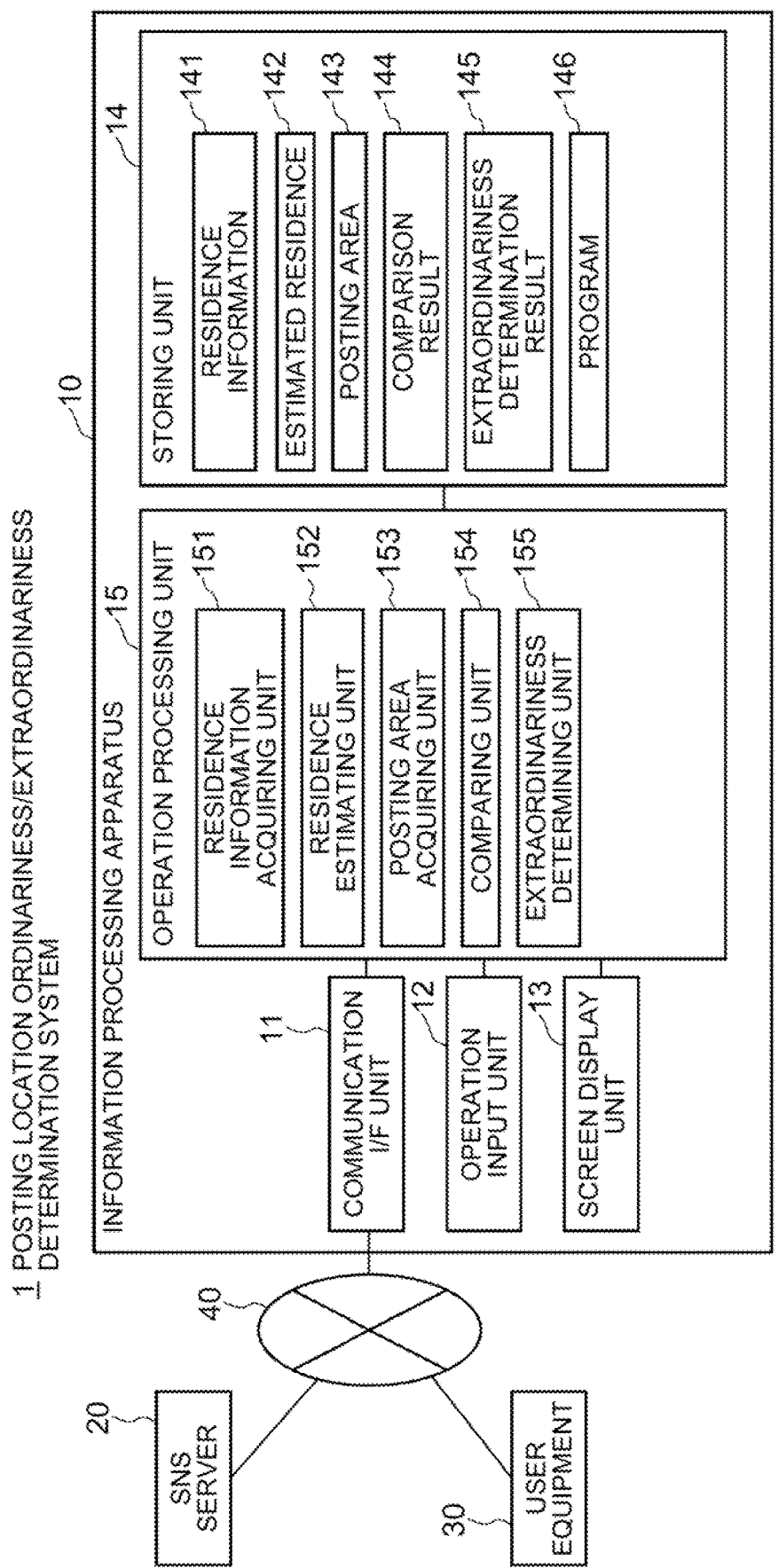
FIG. 1 is a block diagram of a posting location ordinariness/extraordinariness determination system according to a first example embodiment of the present invention.

FIG. 1 is a block diagram of a posting location ordinariness/extraordinariness determination system 1 according to a first example embodiment of the present invention. Referring to FIG. 1, the posting location ordinariness/extraordinariness determination system 1 includes an information processing apparatus 10, an SNS server 20, user equipment 30, and a network 40 such as the Internet.

The SNS server 20 is a server that provides the SNS to the user of the user equipment 30 via the network 40. The SNS is an example of an online service that allows a plurality of users to have some kind of connection on the Internet. Although only one SNS server 20 is provided in FIG. 1, two or more SNS servers may be provided, or one or more servers that manage the social media other than the SNS may be provided.

The SNS server 20 stores therein identification information (hereinafter referred to as an account) that uniquely identifies a user subscribing to the SNS. An account includes at least one of ID, user name, and password. Moreover, the SNS server 20 stores therein a variety of information such as personal information on a user uniquely identified by an account in association with the account. Information stored in association with an account will be referred to as account information hereinafter. Account information includes profile information, post information, and the like.

Further, the SNS server 20 stores therein information representing a relation between users subscribing to the SNS (hereinafter referred to as user-related information). User-related information may be any information as long as it is information on some kind of connection between users subscribing to the SNS. For example, user-related information may be information on an account having an association such as "friend", "follow" and "follower" of each account. User-related information may include information on an account mentioned in post information of each account. User-related information may include information on an account having post information of quoted or "retweeted" post information of each account and an account having a history of, for example, "liking" post information of each account. User-related information may include information on an account having a history of viewing account information including profile and post information of each account, that is, an account having left a "footprint".

The user equipment 30 is an SNS client device that accesses the SNS server 20 in accordance with an operation by the user. The user equipment 30 is, for example, a personal computer, a tablet device, a smartphone, a mobile phone, and the like. An SNS application program installed in the user equipment 30 uses the SNS service via an API (Application Programming Interface) provided by the SNS server 20. For example, the user operates the SNS application to log in with his/her own account, posts on a timeline, inputs and views chat conversations and the like, and registers an account connection such as a friendship and a follow relation. The user equipment 30 is generally present for each user that subscribes to the SNS server 20.

The information processing apparatus 10 is connected to the network 40. The information processing apparatus 10 is configured to determine whether an area where the user of the user equipment 30 has posted on the social media is an ordinary activity area or an extraordinary activity area for the user. Among the users subscribing to the SNS server 20, a user for whom the extraordinariness of a posting area is to be determined will be referred to as a target user. Moreover, an account and account information of the target user will be referred to as a target account and target account information. Furthermore, a user who has some kind of connection with the target user on the social media will be referred to as a related user. Moreover, an account and account information of the related user will be referred to as a related account and related account information. In this example embodiment, based on knowledge that friends having some kind of connection are geographically close to each other, the residence of the target user is estimated from the residence information of the related user. Then, in this example embodiment, the information processing apparatus 10 is configured to determine the ordinariness/extraordinariness of the posting area of the target user based on the result of comparing the posting area of the target user and the estimated residence of the target user.

The information processing apparatus 10 includes a communication I/F unit 11, an operation input unit 12, a screen display unit 13, a storing unit 14, and an operation processing unit 15.

The communication I/F unit 11 is a communication device that performs data communication with an external device such as the SNS server 20. A communication scheme may be either wired or wireless. The operation input unit 12 is an input device such as a keyboard and a mouse, and detects an operation by the user and outputs to the operation processing unit 15. The screen display unit 13 is a screen display device such as an LCD (Liquid Crystal Display). The screen display unit 13 displays a variety of information such as a determination result on a screen in accordance with an instruction by the operation processing unit 15.

The storing unit 14 is a storage device such as a hard disk and a memory. The storing unit 14 stores therein processing information necessary for a variety of processing executed by the operation processing unit 15 and a program 146. The program 146 is loaded to and executed by the operation processing unit 15 to implement various kinds of processing units. The program 146 is loaded in advance from an external device (not illustrated) or a recording medium (not illustrated) via a data input/output function such as the communication I/F unit 11, and is stored into the storing unit 14.

Major processing information stored in the storing unit 14 are residence information 141, an estimated residence 142, a posting area 143, a comparison result 144, and an extraordinariness determination result 145.

The residence information 141 is information that geographically identifies the residence of a user who has an account related to the account of the target user by user-related information. That is to say, the residence information 141 is information of the residence of the related user. Herein, the residence of the related user is an area where the related user lives, and is intended to be, for example, a region such as a prefecture or a municipality. However, what unit regions are separated by is not particularly limited. For example, a region specified by the latitudes and longitudes of the north, south, east and west endpoints may be referred to as the residence of the related user. Moreover, the residence of the related user may include a plurality of geographically separated regions. Furthermore, the residence of the related user may include the area of work, station on the commuting route and the like of the related user. The residence information 141 is present for each related user.

The estimated residence 142 is information that geographically specifies the residence of the target user estimated from the residence information 141. The estimated residence 142 is estimated from the residence of the related user. Therefore, the estimated residence 142 represents, for example, a region such as a prefecture or a municipality, as well as the residence of the related user that is the source of the estimation. Moreover, the estimated residence 142 may represent a region specified by, for example, the latitudes and longitudes of the north, south, east and west endpoints. Moreover, the estimated residence 142 may include a plurality of geographically separated regions. Furthermore, the estimated residence 142 may include an area of work, a station on a commuting route, and the like.

The posting area 143 is information that geographically specifies an area where the target user has posted content on the social media. The posting area 143 is present for each post by the target user. The posting area 143 may be, for example, the address of the posting area. Alternatively, the posting area 143 may be the latitude and longitude of the posting area.

The comparison result 144 is information representing the result of geographically comparing the posting area 143 with the estimated residence 142. The comparison result 144 may be, for example, information representing whether the posting area 143 is inside the estimated residence 142 or outside the estimated residence 142.

The extraordinariness determination result 145 is information representing the result of determination whether the posting area 143 is an ordinary activity area or an extraordinary activity area for the target user.

The operation processing unit 15 is an operation processing device that has a microprocessor such as an MPU and a peripheral circuit thereof. The operation processing unit 15 loads the program 146 from the storing unit 14 and executes to make the abovementioned hardware and the program 146 cooperate with each other and implement various kinds of processing units. The processing units implemented by the operation processing unit 15 include a residence information acquiring unit 151, a residence estimating unit 152, a posting area acquiring unit 153, a comparing unit 154, and an extraordinariness determining unit 155.

The residence information acquiring unit 151 is configured to acquire information of the residence of the related user from the SNS server 20 through the communication I/F unit 11 and store the residence information 141 into the storing unit 14. Alternatively, the residence information acquiring unit 151 is configured to acquire information of the residence of the related user from a database, which is not shown in the drawings, for accumulating accounts and account information acquired from the SNS server 20 and store the residence information 141 into the storing unit 14.

The residence estimating unit 152 is configured to estimate the residence of the target user based on the residence information 141 stored in the storing unit 14 and store the estimated residence 142 into the storing unit 14.

The posting area acquiring unit 153 is configured to acquire a post by the target user from the SNS server 20 through the communication I/F unit 11, further acquire the area of the acquired post, and store the posting area 143 into the storing unit 14.

The comparing unit 154 is configured to geographically compare the estimated residence 142 and the posting area 143 that are stored in the storing unit 14 and store the comparison result 144 into the storing unit 14.

The extraordinariness determining unit 155 is configured to determine whether the posting area 143 stored in the storing unit 14 is an ordinary activity area or an extraordinary activity area for the target user based on the comparison result 144 stored in the storing unit 14, and store the extraordinariness determination result 145 into the storing unit 14. For example, in a case where the comparison result 144 indicates that the posting area 143 is inside the estimated residence 142, the extraordinariness determining unit 155 determines that the posting area 143 is an ordinary activity area for the target user. On the other hand, in a case where the comparison result 144 indicates that the posting area 143 is outside the estimated residence 142, the extraordinariness determining unit 155 determines that the posting area 143 is an extraordinary activity area for the target user.

Next, an operation of the posting location ordinariness/extraordinariness determination system 1 will be described. Since operations of the SNS server 20 and the user equipment 30 are well known, an operation of the information processing apparatus 10 will be described below.

Figure 2:
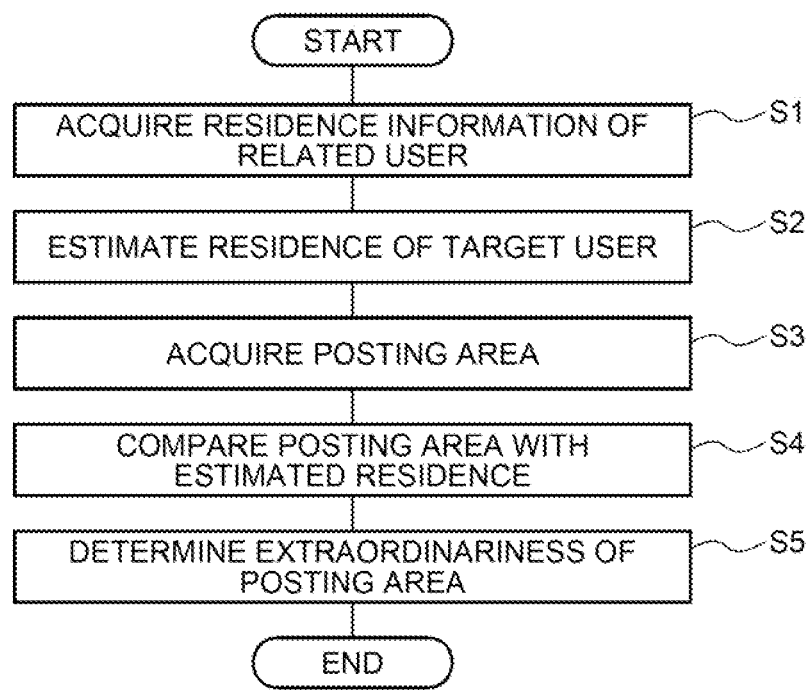
FIG. 2 is a flowchart showing an example of an operation of an information processing apparatus in the posting location ordinariness/extraordinariness determination system according to the first example embodiment of the present invention.

FIG. 2 is a flowchart showing an example of the operation of the information processing apparatus 10. Referring to FIG. 2, first, the residence information acquiring unit 151 acquires information of the residence of the related user having some kind of connection with the target user on the social media from the SNS server 20, and stores the residence information 141 into the storing unit 14 (step S1). Next, the residence estimating unit 152 estimates the residence of the target user based on the residence information 141 acquired by the residence information acquiring unit 151, and stores the estimated residence 142 into the storing unit 14 (step S2). Next, the posting area acquiring unit 153 acquires a post by the target user from the SNS server 20, acquires a posting area from the acquired post, and stores the posting area 143 into the storing unit 14 (step S3). Next, the comparing unit 154 compares the estimated residence 142 of the target user estimated by the residence estimating unit 152 with the posting area 143 acquired by the posting area acquiring unit 153, and stores the comparison result 144 into the storing unit 14 (step S4). Next, the extraordinariness determining unit 155 determines whether the posting area 143 is an ordinary activity area or an extraordinary activity area for the target user based on the comparison result 144 by the comparing unit 154, and stores the extraordinariness determination result 145 into the storing unit 14 (step S5). The extraordinariness determining unit 155 may display the extraordinariness determination result 145 on the screen display unit 13 or/and output to an external device through the communication I/F unit 11.

Subsequently, major components of the information processing apparatus 10 will be described in more detail.

First, the residence information acquiring unit 151 will be described.

Figure 3:
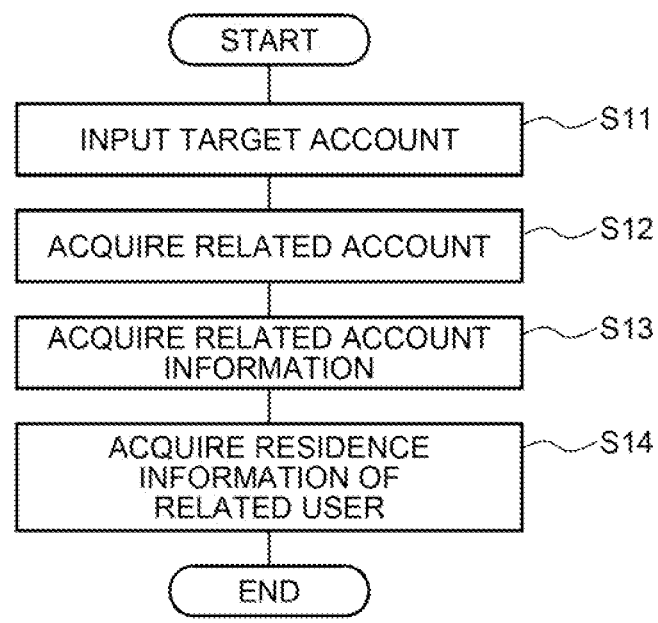
FIG. 3 is a flowchart showing an example of an operation of a residence information acquiring unit in the posting location ordinariness/extraordinariness determination system according to the first example embodiment of the present invention.

FIG. 3 is a flowchart showing an example of an operation of the residence information acquiring unit 151. Referring to FIG. 3, the residence information acquiring unit 151 first inputs an account on the social media of the target user (target account) from an external device through the operation input unit 12 or the communication I/F unit 11 (step S11). Next, the residence information acquiring unit 151 accesses the SNS server 20 through the communication I/F unit 11, and acquires the account of a user who has some kind of connection with the target user (related account) (step S12). For example, the residence information acquiring unit 151 acquires the related account that has an association such as "friend", "follow" or "follower" of the target account. Alternatively, the residence information acquiring unit 151 acquires the related account that has post information relating to the post information of the target account. Alternatively, the residence information acquiring unit 151 acquires the related account that has post information quoting the post information of the target account, and the related account that has a history of, for example, "liking" the post information of the target account. Alternatively, the residence information acquiring unit 151 acquires the related account that has a history of viewing the account information including profile and post information of the target account.

Next, the residence information acquiring unit 151 acquires, for each of the acquired related accounts, related account information corresponding to the related account from the SNS server 20 (step S13). Next, the residence information acquiring unit 151 acquires, from each of the acquired related account information, information of the residence of the related user (step S14). For example, the residence information acquiring unit 151 may acquire the residence information of the related user from the residence, hometown and the like of the profile information included in the related account information. Alternatively, the residence information acquiring unit 151 may acquire the residence information of the related user from words that allows identification of the residence from the post information included in the related account information.

Next, the residence estimating unit 152 will be described.

As a technique for estimating the residence of a user on the social media by using the friendship of the user, there is a technique described in Non-Patent Document 2 (hereinafter referred to as a second related technique). In this example embodiment, the residence estimating unit 152 estimates the residence of the target user from the residence information of the related user by using the second related technique. However, the residence estimating unit 152 may use a technique other than the second related technique to estimate the residence of the target user from the residence of the related user.

A knowledge that is the premise of the second related technique is that "the presence or absence of a friendship is related to the distance between the residences of the friends. That is to say, by using the fact that friends live relatively close to each other, the residence of the target user is estimated from the residence of the related user. Specifically, in the second related technique, first, the residences of the related users are regarded as candidates for the residence of the target user. Next, for each of the candidates for the residence, a score indicating the possibility that the target user resides in the candidate for the residence is calculated. Next, the candidate for the residence with the highest score or n candidates for the residence with the top n scores (n is a positive integer equal to or greater than 1) are estimated as the residence of the target user. A possibility $\gamma_{l_u}$ that the target user u resides in the candidate for the residence $l_u$ is calculated by Equation 1 shown in FIG. 4.

In FIG. 4, v represents a user of the social media, and V represents the set of all the users. E represents the set of edges formed by the users, l represents an area, and $l_v$ represents the residential area of the user v. An edge refers to a relation between the users. Moreover, represents the geographical distance between $l_u$ and $l_v$. Equation 3 is a relation equation between the presence or absence of friendship and the distance between friends, where a, b and c are real number parameters. A value indicated by Equation 2 is a constant that all areas have. Although $\gamma_l$ in Equation 1 is not described in Non-Patent Document 2, it is supposed to be an error and therefore it is supplemented.

Next, the posting area acquiring unit 153 will be described.

In a case where the latitude and longitude of a shooting area or a current area are linked to a posted content using information such as a geotag, the posting area acquiring unit 153 may acquire the latitude and longitude of a posting area from the linked information. On the other hand, in a case where information such as a geotag is not linked to a post, the posting area acquiring unit 153 may estimate a posting area by using region-specific words, hashtags and the like included in the posted text.

Thus, according to the posting location ordinariness/extraordinariness determination system 1 according to this example embodiment, even if the target user is a user who does not often post in his/her daily life, it is possible to determine whether an area where the target user has posted is an ordinary activity area or an extraordinary activity area for the target user. The reason is that the information processing apparatus 10 acquires the residence information of the related user who has some kind of connection on the social media with the target user, estimates the residence of the target user from the residence information of the related user, and determines the ordinariness/extraordinariness of the posting area of the target user based on the result of comparison between the posting area and the estimated residence.

Further, according to the posting location ordinariness/extraordinariness determination system 1, even if the target user has not registered his/her residence in the profile information, it is possible to determine whether an area where the target user has posted is an ordinary activity area or an extraordinary activity area for the target user. The reason is that the information processing apparatus 10 acquires the residence information of the related user who has some kind of connection on the social media with the target user, estimates the residence of the target user from the residence information of the related user, and determines the ordinariness/extraordinariness of the posting area of the target user based on the result of comparison between the posting area and the estimated residence.

Second Example Embodiment

Next, a posting location ordinariness/extraordinariness determination system 2 according to a second example embodiment of the present invention will be described with reference to the drawings.

The posting location ordinariness/extraordinariness determination system 1 according to the first example embodiment shown in FIG. 1 estimates the residence of the target user from the residence information of another user who has some kind of connection with the target user on the social media. On the other hand, the ordinariness/extraordinariness determination system 2 according to this example embodiment estimates the residence of the target user from the residence information of another user who has an interaction with the target user in the real space. Below, a user who has an interaction with the target user in the real space will be referred to as an offline friend.

Figure 5:
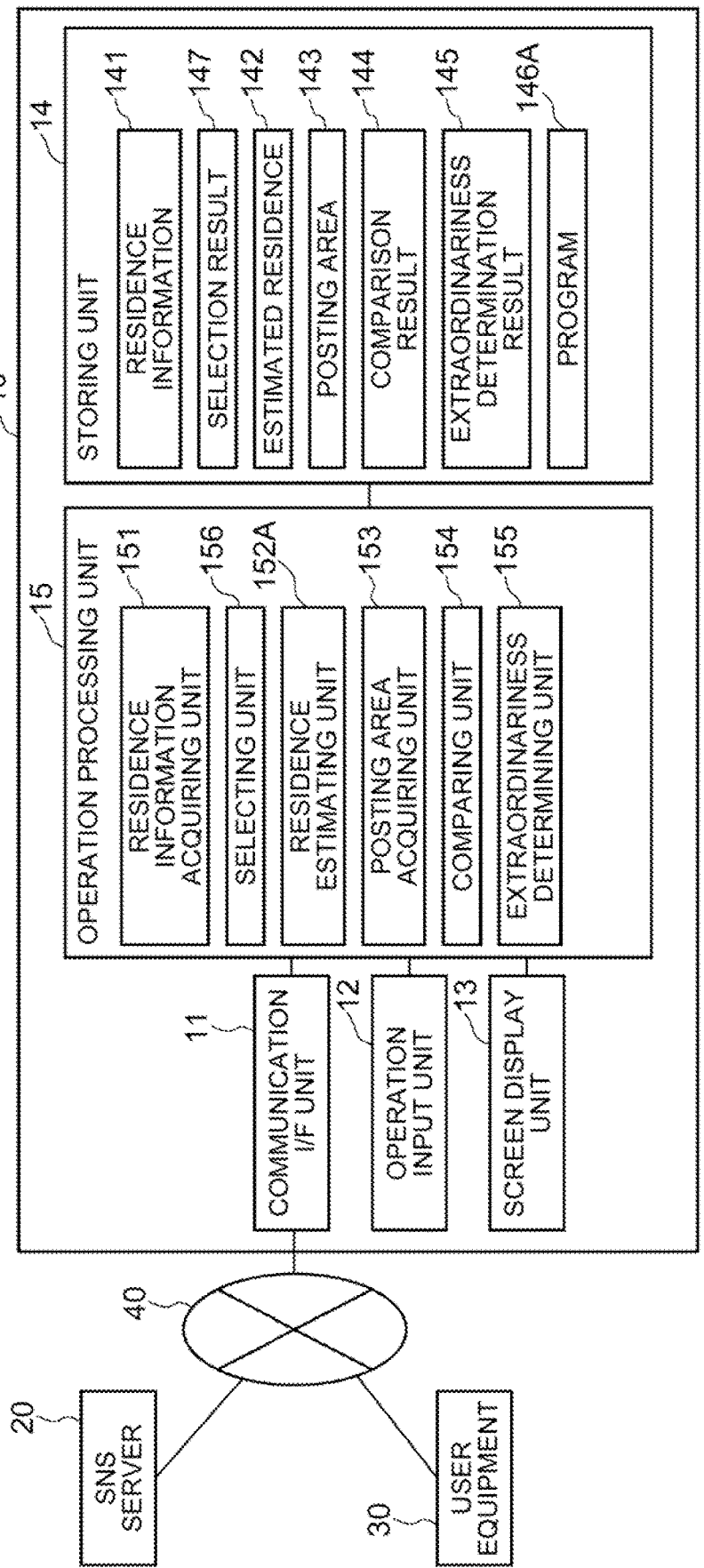
FIG. 5 is a block diagram of a posting location ordinariness/extraordinariness determination system according to a second example embodiment of the present invention.

FIG. 5 is a block diagram of the posting location ordinariness/extraordinariness determination system 2, where the same reference numerals as in FIG. 1 denote the same parts. The posting location ordinariness/extraordinariness determination system 2 is different from the posting location ordinariness/extraordinariness determination system 1 shown in FIG. 1 in including a selection result 147, a program 146A, a selecting unit 156 and a residence estimating unit 152A, and is otherwise the same.

The selection result 147 is information of the related user selected as the offline friend among the related users who have some kinds of connection with the target user. For example, the selection result 147 includes the account of the offline friend.

The program 146A is configured to cause the operation processing unit 15 to function as the residence information acquiring unit 151, the selecting unit 156, the residence estimating unit 152A, the posting area acquiring unit 153, the comparing unit 154, and the extraordinariness determining unit 155.

The selecting unit 156 is configured to select all the related users who have interactions with the target user in the real space from among the related users and store the selection result 147 into the storing unit 14.

The residence estimating unit 152A is configured to estimate the residence of the target user from the residence information of the related user selected as the offline friend and store the estimated residence 142 into the storing unit 14.

Next, an operation of the information processing apparatus 10 in the posting location ordinariness/extraordinariness determination system 2 will be described.

Figure 6:
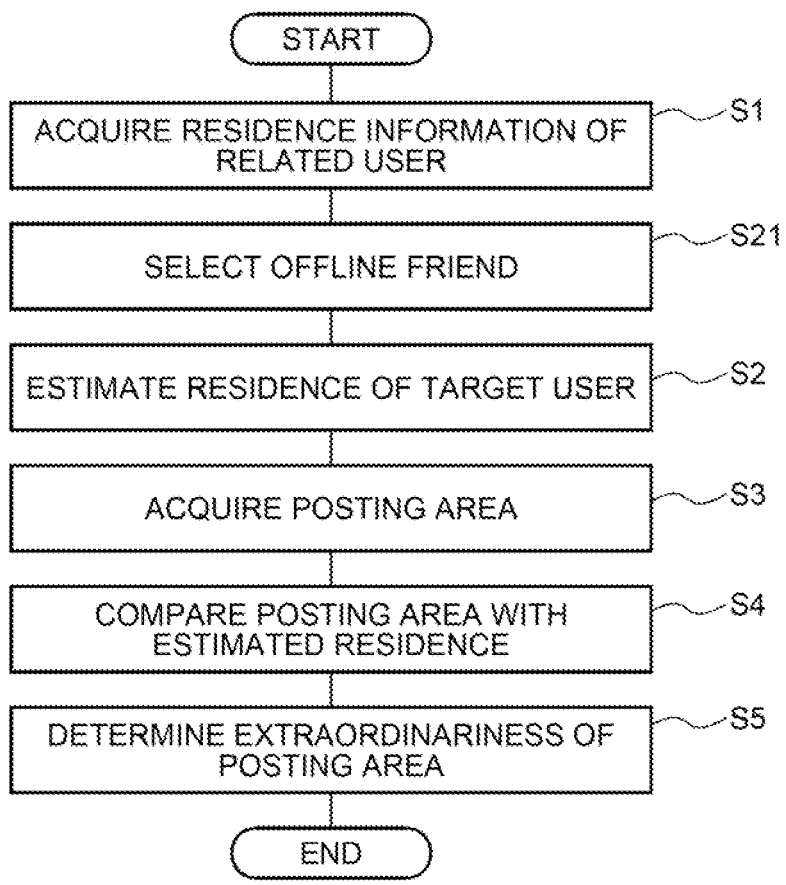
FIG. 6 is a flowchart showing an example of an operation of an information processing apparatus in the posting location ordinariness/extraordinariness determination system according to the second example embodiment of the present invention.

FIG. 6 is a flowchart showing an example of the operation of the information processing apparatus 10. Referring to FIG. 6, first, the residence information acquiring unit 151 acquires information of the residences of the related users who have some kind of connection with the target user on the social media from the SNS server 20, and stores the residence information 141 into the storing unit 14 (step S1). Next, the selecting unit 156 selects all the related users who have interactions with the target user in the real space, and stores the selection result 147 into the storing unit 14 (step S21). After that, the same operation at steps S2 to S5 as in FIG. 2 is performed.

Subsequently, the selecting unit 156 and the residence estimating unit 152A will be described in more detail.

First, the selecting unit 156 will be described.

Example 1 of Selecting Unit 156

The selecting unit 156 selects the related user whose related account is a local account related to a specific region as the offline friend of the target user from among the related users.

A local account means a social media account operated targeting for a specific area or region among social media accounts. A specific example of a local account is the Twitter account (@kawasaki_asaoku) operated by the Asao Ward Office in Kawasaki City, Kanagawa Prefecture.

Information obtained from a local account is information that is rooted in the area, and those who form associations with the local account are considered to be users who work in the region and want information about the region. Therefore, a user who has a friendship with a local account is considered to work in a region where the local account works. In a case where the account of a friend of the target user is a local account, the local account can be regarded as an important information source for estimating the residence of the target user.

The selecting unit 156 may determine whether or not the related account is a local account, for example, in the following manner.

For example, the selecting unit 156 examines by text analysis whether or not the profile information included in the related account information contains a description such as a statement indicating that the related account is operated targeting for a specific area or region. Then, the selecting unit 156 determines that the related account is a local account in a case where there is a description such as "authorized by A City Hall" or "this is an account that primarily transmits information about A City".

Further, the selecting unit 156 compares the related account with a list of local accounts created and stored in advance, and determines the related account described in the list of local accounts to be a local account.

Example 2 of Selecting Unit 156

The selecting unit 156 selects the offline friend of the target user from among the related users by focusing on the proximity (including overlap) of the residences of the related users.

A range of actions in which a human can move ordinarily is narrowed down to some space. The fact that there is proximity in the range of actions between friends indicates a possibility that the friends also have an interaction with each other in the real space. Therefore, it can be considered that the related users whose ranges of actions are proximity to each other are highly likely to be friends in the real space, that is, offline friends.

The selecting unit 156 uses, for example, DBSCAN, which is a density-based clustering method, as a method for selecting the offline friend based on the proximity of the ranges of actions between the related users. Specifically, the selecting unit 156 uses DBSCAN to group the set of the residences of the related users into one or more clusters so as to satisfy a distance and minimum number of constituents designated in advance. Then, the selecting unit 156 selects the related user who belongs to the cluster formed by the grouping as the offline friend.

Example 3 of Selecting Unit 156

The selecting unit 156 selects the offline friend of the target user from among the related users by focusing on the proximity in the movement histories of the related users.

A user whose travel distance is small is considered to be a stay-at-home user. Having an association with a stay-at-home user is considered as having a direct interaction in the real world. Therefore, among the related users, a stay-at-home user is considered to be the offline friend.

For example, for each of the associated users, the selecting unit 156 refers to the associated account information to obtain a distance between check-in areas, and compares the average value or median value of the distances with a threshold value set in advance. Then, in a case where the average value or median value of the distances is equal to or less than the threshold value, the selecting unit 156 determines that the related user is the offline friend.

Another Example of Selecting Unit 156

The configuration of the selecting unit 156 is not limited to the above configurations. For example, the selecting unit 156 may determine whether or not the related users have a friendship with each other, and determine the related users having a friendship with each other to be offline friends. Moreover, in a case where the related account is the account of a famous user such as a celebrity, the selecting unit 156 may determine that the user is not the offline user.

Next, the residence estimating unit 152A will be described.

For example, as well as the residence estimating unit 152, the residence estimating unit 152A estimates the residence of the target user from the residence information of the related user by using the second related technique. Meanwhile, the residence estimating unit 152A may estimate the residence of the target user from the residence of the related user by using a technique other than the second related technique.

The residence estimating unit 152A first sets the residences of the related users as candidates for the residence of the target user. Next, the residence estimating unit 152A calculates, for each of the candidates for the residence, a score indicating a possibility that the target user resides in the candidate for the residence. Here, the residence estimating unit 152A calculates the score by weighting the candidate for the residence of the related user determined to be the offline friend. Next, the residence estimating unit 152A estimates the candidate for the residence with the highest score or n candidates for the residence with the top n scores (n is a positive integer equal to or greater than 1) as the residence of the target user. The possibility $\gamma'_{l_u}$ that the target user u resides in the candidate for the residence $l_u$ is calculated by Equation 4 shown in FIG. 4.

$W_v$ in Equation 4 is a weight. The weight $W_v$ is set to a fixed value of 1.0 for non-offline friends, that is, online friends, as shown in Equation 5 of FIG. 4. On the other hand, for offline friends, w is given as shown in Equation 5 of FIG. 4. Here, w is set to a predetermined value greater than 1, such as 4.0.

Thus, according to this example embodiment, the same effects as in the first example embodiment can be obtained and, since the residence of the target user is estimated from the residence information of the offline friend, the residence of the target user can be estimated in a narrower range. As a result, it is possible to more precisely execute determination whether a posting location is an ordinary activity area or an extraordinary activity area for the target user.

Third Example Embodiment

Next, a posting location ordinariness/extraordinariness determination system 3 according to a third example embodiment of the present invention will be described with reference to the drawings.

Figure 7:
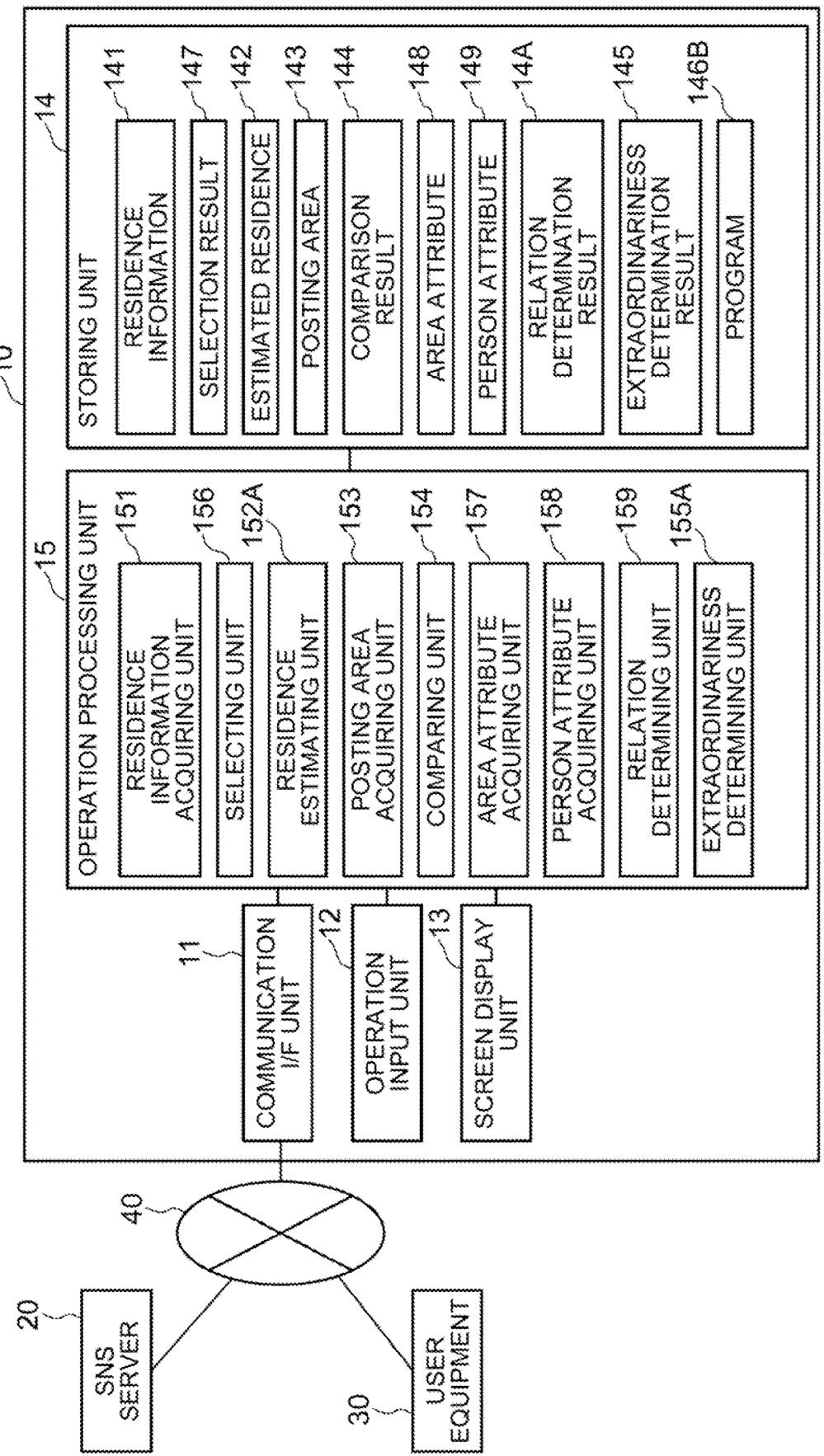
FIG. 7 is a block diagram of a posting location ordinariness/extraordinariness determination system according to a third example embodiment of the present invention.

FIG. 7 is a block diagram of the posting location ordinariness/extraordinariness determination system 3, and the same reference numerals as in FIG. 5 denote the same parts. The posting location ordinariness/extraordinariness determination system 3 is different from the posting location ordinariness/extraordinariness determination system 2 shown in FIG. 5 in including an area attribute 148, a person attribute 149, a relation determination result 14A, a program 146B, an area attribute acquiring unit 157, a person attribute acquiring unit 158, a relation determining unit 159 and an extraordinariness determining unit 155A, and is otherwise the same.

The area attribute 148 is information representing an attribute of the posting area 143. For example, the area attribute 148 is information representing whether or not the posting area 143 is a famous tourist destination, whether or not a fancy restaurant, and the like.

The person attribute 149 is information representing an attribute of the target user. For example, the person attribute 149 is information representing the taste, income, occupation and others of the target user.

The relation determination result 14A is the result of determining the relation between the area attribute 148 and the person attribute 149. For example, the relation determination result 14A is information representing the presence/absence of the relation between the area attribute 148 and the person attribute 149 or the degree of the relation (for example, low, high).

The program 146B is configured to cause the operation processing unit 15 to function as the residence information acquiring unit 151, the selecting unit 156, the residence estimating unit 152A, the posting area acquiring unit 153, the comparing unit 154, the area attribute acquiring unit 157, the person attribute acquiring unit 158, the relation determining unit 159, and the extraordinariness determining unit 155A.

The area attribute acquiring unit 157 is configured to acquire an attribute of the posting area 143 and store the area attribute 148 into the storing unit 14. For example, the area attribute acquiring unit 157 stores in advance a correspondence table between the latitudes/longitudes and area attributes. The area attribute acquiring unit 157 may acquire area information registered in the correspondence table so as to correspond to the latitude and longitude matching the latitude and longitude indicated by the posting area 143, as the area attribute of the posting area 143. When the area attribute acquiring unit 157 cannot acquire a significant area attribute, the area attribute acquiring unit 157 sets the area attribute 148 to a null value.

The person attribute acquiring unit 158 is configured to acquire an attribute of the target user and store the person attribute 149 into the storing unit 14. For example, the person attribute acquiring unit 158 may acquire the target user's attributes such as taste, income and occupation from the profile information in the target account information. When the person attribute acquiring unit 158 cannot acquire a significant person attribute, the person attribute acquiring unit 158 sets the person attribute 149 to a null value.

The relation determining unit 159 is configured to determine the presence or absence of a relation between the area attribute 148 and the person attribute 149 and the degree of the relation, and store the relation determination result 14A into the storing unit 14. When at least either the area attribute 148 or the person attribute 149 is a null value, the relation determining unit 159 sets the relation determination result 14A to a null value.

The extraordinariness determining unit 155A is configured to determine the ordinariness/extraordinariness of the posting area 143 based on the comparison result 144 and the relation determination result 14A, and store the extraordinariness determination result 145 into the storing unit 14.

For example, in a case where the comparison result 144 indicates that the posting area 143 is outside the estimated residence 142, when the relation determination result 14A is a null value, the extraordinariness determining unit 155A determines that the posting area 143 is an extraordinary activity area for the target user. When the relation determination result 14A is not a null value, the extraordinariness determining unit 155A determines whether the posting area 143 is an ordinary activity area or an extraordinary activity area for the target user based on the relation determination result 14A. That is to say, in a case where the relation determination result 14A represents a determination that the area attribute 148 and the person attribute 149 have a relation or the relation is high, the extraordinariness determining unit 155A determines that the posting area 143 is an ordinary activity area for the target user. On the other hand, in a case where the relation determination result 14A represents a determination that the area attribute 148 and the person attribute 149 have no relation or the relation is low, the extraordinariness determining unit 155A determines that the posting area 143 is an extraordinary activity area for the target user.

Further, in a case where the comparison result 144 indicates that the posting area 143 is inside the estimated residence 142, when the relation determination result 14A is a null value, the extraordinariness determining unit 155A determines that the posting area 143 is an ordinary activity area for the target user. When the relation determination result 14A is not a null value, the extraordinariness determining unit 155A determines whether the posting area 143 is an ordinary activity area or an extraordinary activity area for the target user based on the relation determination result 14A. That is to say, in a case where the relation determination result 14A represents a determination that the area attribute 148 and the person attribute 149 have no relation or the relation is low, the extraordinariness determining unit 155A determines that the posting area 143 is an extraordinary activity area for the target user. On the other hand, in a case where the relation determination result 14A represents a determination that the area attribute 148 and the person attribute 149 have a relation or the relation is high, the extraordinariness determining unit 155A determines that the posting area 143 is an ordinary activity area for the target user.

Next, an operation of the information processing apparatus 10 in the posting location ordinariness/extraordinariness determination system 3 will be described.

Figure 8:
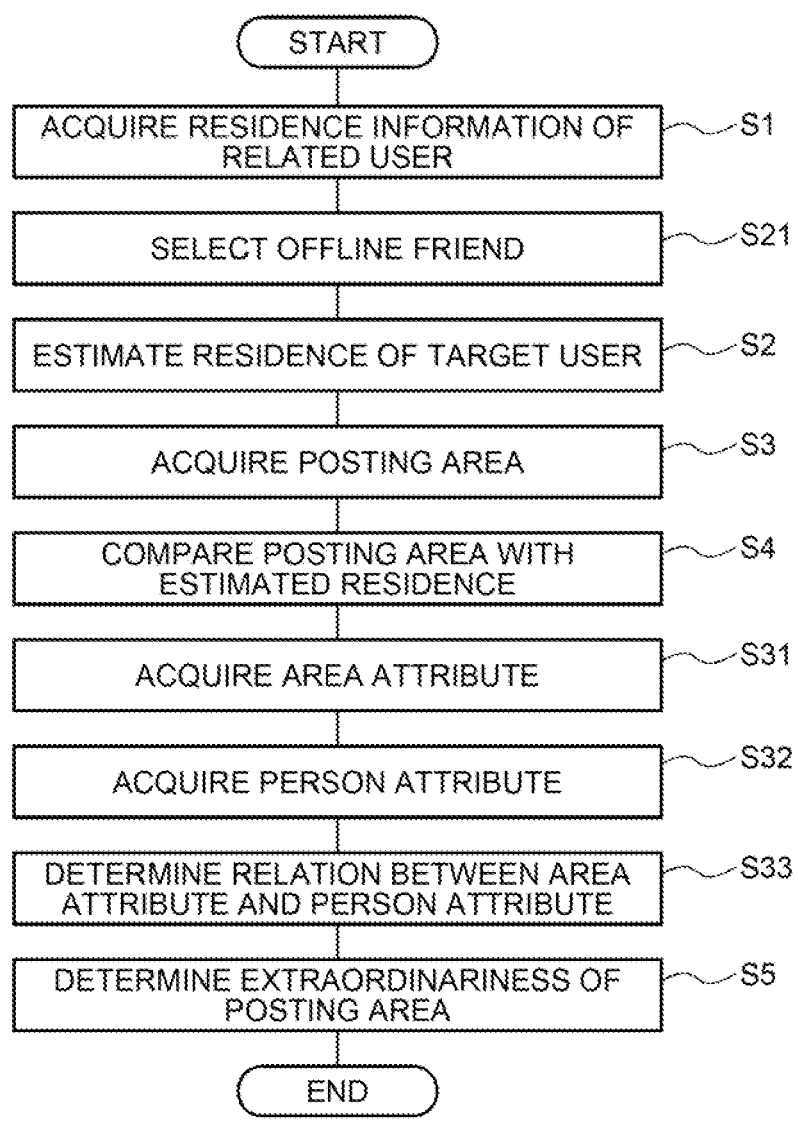
FIG. 8 is a flowchart showing an example of an operation of an information processing apparatus in the posting location ordinariness/extraordinariness determination system according to the third example embodiment of the present invention.

FIG. 8 is a flowchart showing an example of the operation of the information processing apparatus 10. Referring to FIG. 8, first, the same operation at steps S1, S21, S2 to S4 as in FIG. 6 is performed. Next, the area attribute acquiring unit 157 acquires an area attribute of the posting area 143 and stores the area attribute 148 into the storing unit 14 (step S31). Next, the person attribute acquiring unit 158 acquires an attribute of the target user and stores the person attribute 149 into the storing unit 14 (step S32). Next, the relation determining unit 159 determines a relation between the area attribute 148 and the person attribute 149, and stores the relation determination result 14A into the storing unit 14 (step S33). Next, the extraordinariness determining unit 155A determines the ordinariness/extraordinariness of the posting area 143 based on the comparison result 144 and the relation determination result 14A (step S5).

Thus, according to this example embodiment, the same effect as in the second example embodiment can be obtained and, since the determination is performed in consideration of the relation between the attribute of the posting area and the attribute of the target user, it is possible to more precisely determine the ordinariness/extraordinariness of the posting area. For example, it is unlikely that the target user ordinarily goes to a luxury area such as a fancy restaurant relative to the income of the target user. Moreover, it is unlikely that the target user ordinarily goes to an area that does not match the target user's taste. In this example embodiment, it is possible to determine that a post at an area that does not match the target user' attribute is not a post at an area where the target user ordinarily works. Moreover, in a case where the target user is a tour conductor or the like, he/she often visits famous sightseeing spots ordinarily. In this example embodiment, it is possible to determine that a post at an area that matches the target user's attribute is a post at an area where the target user ordinarily works.

Fourth Example Embodiment

Next, a posting location ordinariness/extraordinariness determination system 4 according to a fourth example embodiment of the present invention will be described with reference to the drawings.

Figure 9:
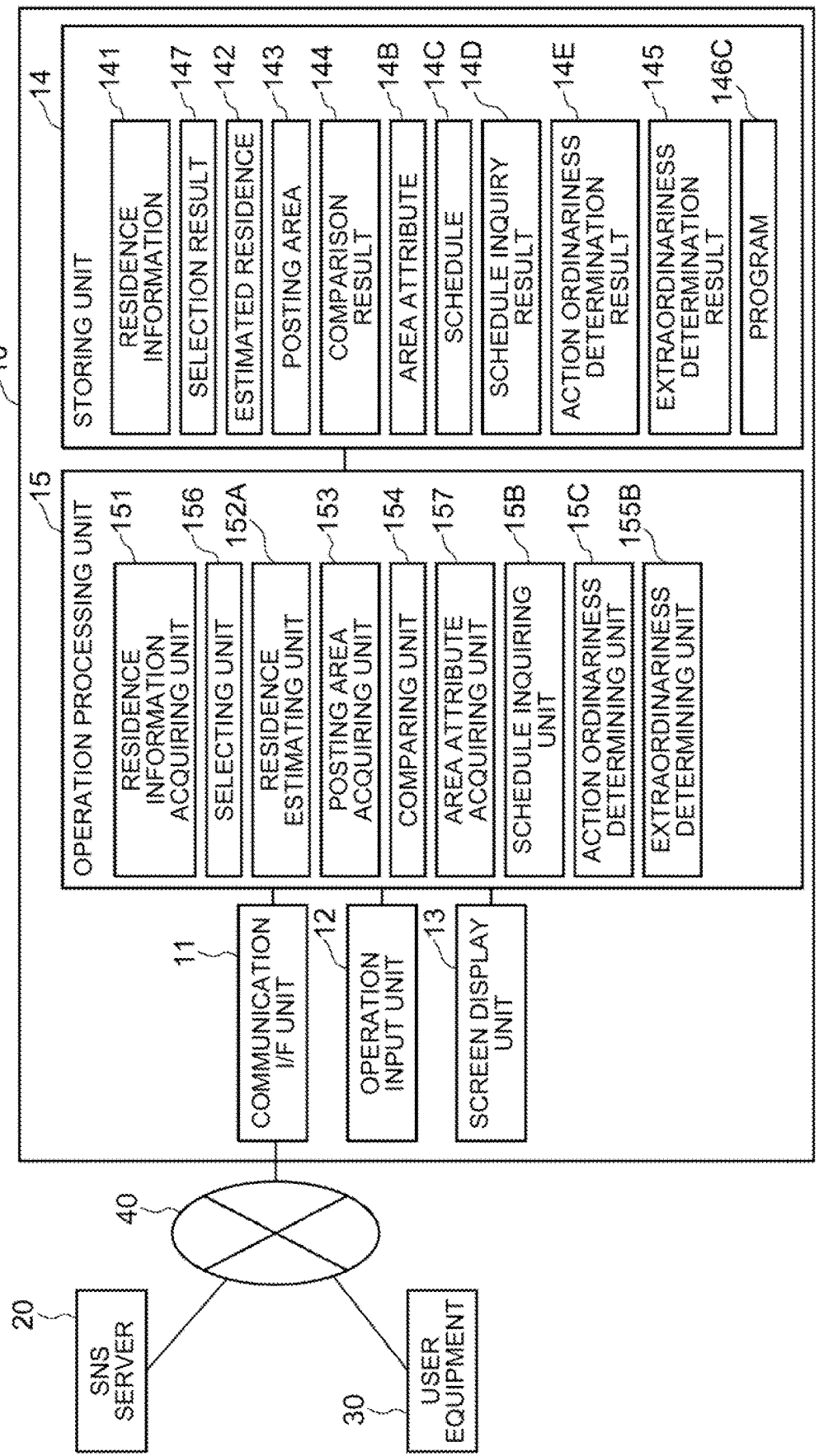
FIG. 9 is a block diagram of a posting location ordinariness/extraordinariness determination system according to a fourth example embodiment of the present invention.

FIG. 9 is a block diagram of the posting location ordinariness/extraordinariness determination system 4, and the same reference numerals as those in FIG. 5 denote the same parts. The posting location ordinariness/extraordinariness determination system 4 is different from the posting location ordinariness/extraordinariness determination system 2 shown in FIG. 5 in including an area attribute 14B, a schedule 14C, a schedule inquiry result 14D, an action ordinariness determination result 14E, a program 146C, an area attribute acquiring unit 157, a schedule inquiring unit 15B, an action ordinariness determining unit 15C and an extraordinariness determining unit 155B, and is otherwise the same.

The area attribute 14B is information representing an attribute of the posting area 143. For example, the area attribute 14B is information representing whether or not the posting area 143 is a dental clinic, a hotel, a theme park, and the like.

The schedule 14C is a database that holds the past action history and the future schedule of the target user. For example, the schedule 14C is information representing the reservation status of a medical institution such as a dental clinic, a business trip schedule, a homecoming schedule, and an event participation schedule.

The schedule inquiry result 14D is information representing the target user's schedule at the posting time and date.

The action ordinariness determination result 14E is information representing the result of determining whether the target user's schedule at the posting time and date indicated by the schedule inquiry result 14D is ordinary or extraordinary.

The program 146C is configured to cause the operation processing unit 15 to function as the residence information acquiring unit 151, the selecting unit 156, the residence estimating unit 152A, the posting area acquiring unit 153, the comparing unit 154, the area attribute acquiring unit 157, the schedule inquiring unit 15B, the action ordinariness determining unit 15C, and the extraordinariness determining unit 155B.

The area attribute acquiring unit 157 is configured to acquire an attribute of the posting area 143 and store the area attribute 14B into the storing unit 14. For example, the area attribute acquiring unit 157 stores in advance a correspondence table between latitudes/longitudes and area attributes. The area attribute acquiring unit 157 may acquire area information registered in the correspondence table so as to correspond to the latitude and longitude matching the latitude and longitude represented by the posting area 143, as an area attribute of the posting area 143. When the area attribute acquiring unit 157 cannot acquire a significant area attribute, the area attribute acquiring unit 157 sets the area attribute 14B to a null value.

The schedule inquiring unit 15B is a unit configured to acquire the posting time and date of a post acquired by the posting area acquiring unit 153, acquire the target user's schedule at the posting time and date, and store the schedule inquiry result 14D into the storing unit 14. When the schedule inquiring unit 15B cannot acquire a significant schedule, the schedule inquiring unit 15B sets the schedule inquiry result 14D to a null value.

In a case where the schedule inquiry result 14D is a null value, the action ordinariness determining unit 15C sets the action ordinariness determination result 14E to a null value. In a case where the schedule inquiry result 14D is not a null value, the action ordinariness determining unit 15C determines whether or not there is a relation between the schedule inquiry result 14D and the area attribute 14B and, when there is no relation, sets the action ordinariness determination result 14E to a null value. When there is a relation between the schedule inquiry result 14D and the area attribute 14B, the action ordinariness determining unit 15C determines whether the target user's schedule at the posting time and date shown by the schedule inquiry result 14D is ordinary or extraordinary in terms of the purpose of the action, the periodicity of the action, and the like. For example, in a case where the schedule inquiry result 14D indicates a visit to hospital for a certain period of time or at a certain frequency, the action ordinariness determining unit 15C determines that it is ordinary. In a case where the schedule inquiry result 14D indicates a business trip or a homecoming for a certain period of time or participation in an annual event in which the user participates every year, the action ordinariness determining unit 15C determines that it is ordinary. In a case where the schedule inquiry result 14D indicates participation in an occasional event or an occasional business trip, the action ordinariness determining unit 15C determines that it is extraordinary.

The extraordinariness determining unit 155B is configured to determine the ordinariness/extraordinariness of the posting area 143 based on the comparison result 144 and the action ordinariness determination result 14E, and store the extraordinariness determination result 145 into the storing unit 14.

For example, in a case where the comparison result 144 indicates that the posting area 143 is outside the estimated residence 142, when the action ordinariness determination result 14E is a null value, the extraordinariness determining unit 155B determines that the posting area 143 is an extraordinary area for the target user. In a case where the action ordinariness determination result 14E is not a null value, when the action ordinariness determination result 14E indicates ordinary, the extraordinariness determining unit 155B determines that the posting area 143 is an ordinary activity area for the target user. When the action ordinariness determination result 14E indicates extraordinary, the extraordinariness determining unit 155B determines that the posting area 143 is an extraordinary activity area for the target user.

Further, in a case where the comparison result 144 indicates that the posting area 143 is inside the estimated residence 142, when the action ordinariness determination result 14E is a null value, the extraordinariness determining unit 155B determines that the posting area 143 is an ordinary area for the target user. In a case where the action ordinariness determination result 14E is not a null value, when the action ordinariness determination result 14E indicates ordinary, the extraordinariness determining unit 155B determines that the posting area 143 is an ordinary activity area for the target user. When the action ordinariness determination result 14E indicates extraordinary, the extraordinariness determining unit 155B determines that the posting area 143 is an extraordinary activity area for the target user.

Next, an operation of the information processing apparatus 10 in the posting location ordinariness/extraordinariness determination system 4 will be described.

Figure 10:
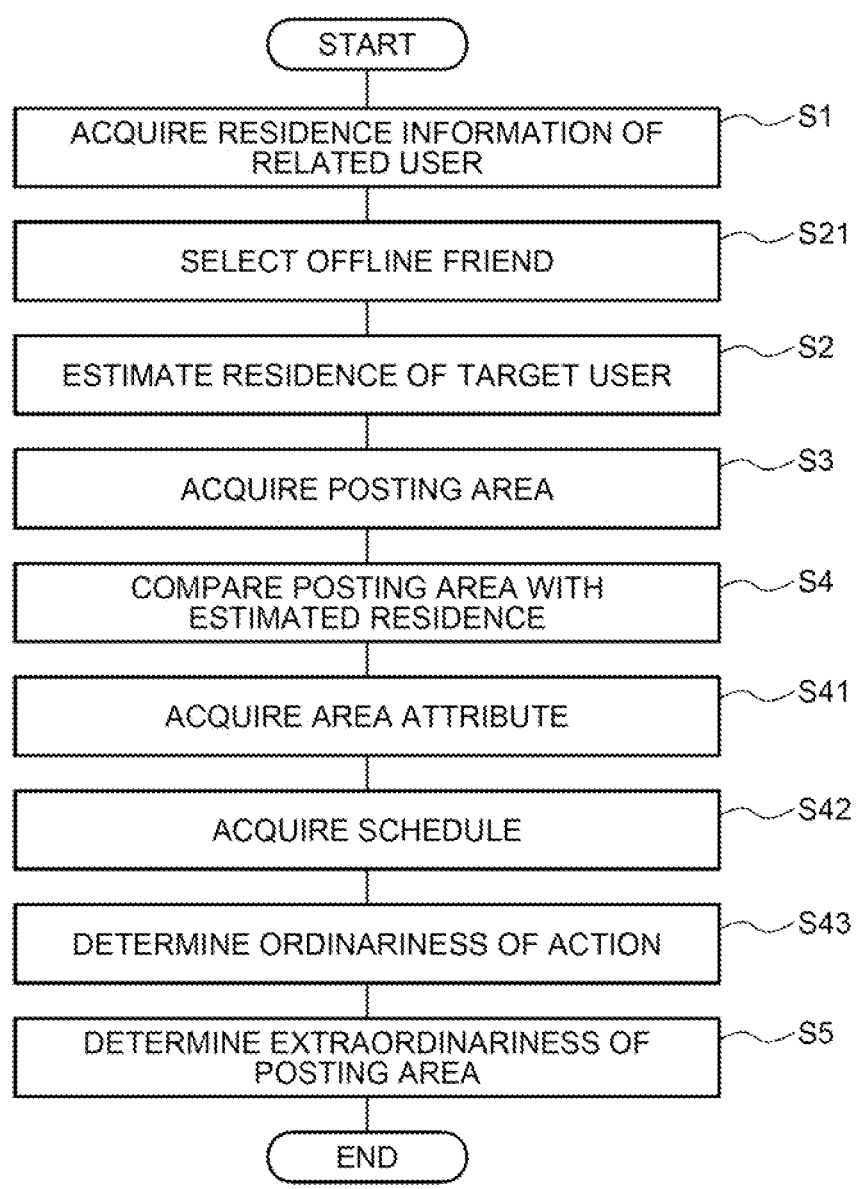
FIG. 10 is a flowchart showing an example of an operation of an information processing apparatus in the posting location ordinariness/extraordinariness determination system according to the fourth example embodiment of the present invention.

FIG. 10 is a flowchart showing an example of the operation of the information processing apparatus 10. Referring to FIG. 10, first, the same operation at steps S1, S21, S2 to S4 as in FIG. 6 is performed. Next, the area attribute acquiring unit 157 acquires an area attribute of the posting area 143, and stores the area attribute 14B into the storing unit 14 (step S41). Next, the schedule inquiring unit 15B acquires the target user's schedule at the posting time and date, and stores the schedule inquiry result 14D into the storing unit 14 (step S42). Next, the action ordinariness determining unit 15C determines whether the schedule inquiry result 14D is ordinary or extraordinary, and stores the action ordinariness determination result 14E into the storing unit 14 (step S43). Next, the extraordinariness determining unit 155B determines the ordinariness/extraordinariness of the posting area 143 based on the comparison result 144 and the action ordinariness determination result 14E (step S5).

Thus, according to this example embodiment, the same effect as in the second example embodiment can be obtained and, since the determination is performed in consideration of the ordinariness/extraordinariness of the target user's activity at the posting time and date, it is possible to more precisely determine the ordinariness/extraordinariness of the posting area. For example, the following determination can be performed.

For example, it is assumed that visiting a specific dental clinic for a certain period of time for dental treatment is stored in the schedule 14C. In this case, the visit to the dental clinic is determined to be an ordinary action for the target user. Therefore, even if the area of the dental clinic is outside the estimated residence of the target user, a post at the area of the dental clinic is determined to be a post at an ordinary activity area.

Further, it is assumed that staying at a certain hotel for a business trip for a fixed period of time is stored in the schedule 14C. In this case, an action around the hotel where the target user stays is determined to be an ordinary action for the target user. Therefore, even if the area of the hotel is outside the estimated residence of the target user, a post at the hotel is determined to be a post at an ordinary activity area. However, when viewed on a year-by-year basis, first, an area such as a hotel that the target user visits for a business trip is extraordinary. Therefore, in a case where sporadically staying at the hotel is stored in the schedule 14C, the action around the hotel is determined to be an extraordinary action for the target user. Therefore, even if the area of the hotel is within the estimated residence of the target user, a post at the hotel is determined to be a post at an extraordinary activity area.

Further, it is assumed that a homecoming to the house of the user's parents or the like (including not only a homecoming but also a visit to an area where the user used to live) during the Bon Festival, New Year's Holidays and the like is stored in the schedule 14C. In this case, an action at the homecoming destination is determined to be an ordinary action for the target user. Therefore, even if the parent's house or the like is outside the estimated residence of the target user, a post at the parent's house or the like is determined to be a post at an ordinary activity area. Moreover, since ordinary/extraordinary activity areas when the user used to live may be known in the case of a homecoming, it is possible to determine ordinariness/extraordinariness based on the range of activities.

It is assumed that participating in an event of a music festival, a theme park, or the like, held regularly every year is stored in the schedule 14C. In this case, participating in the event is determined to be an ordinary action for the target user. Therefore, even if the event venue is outside the estimated residence of the target user, a post at the event venue is determined to be a post at an ordinary activity area.

Fifth Example Embodiment

Next, a posting location ordinariness/extraordinariness determination system 5 according to a fifth example embodiment of the present invention will be described with reference to the drawings.

Figure 11:
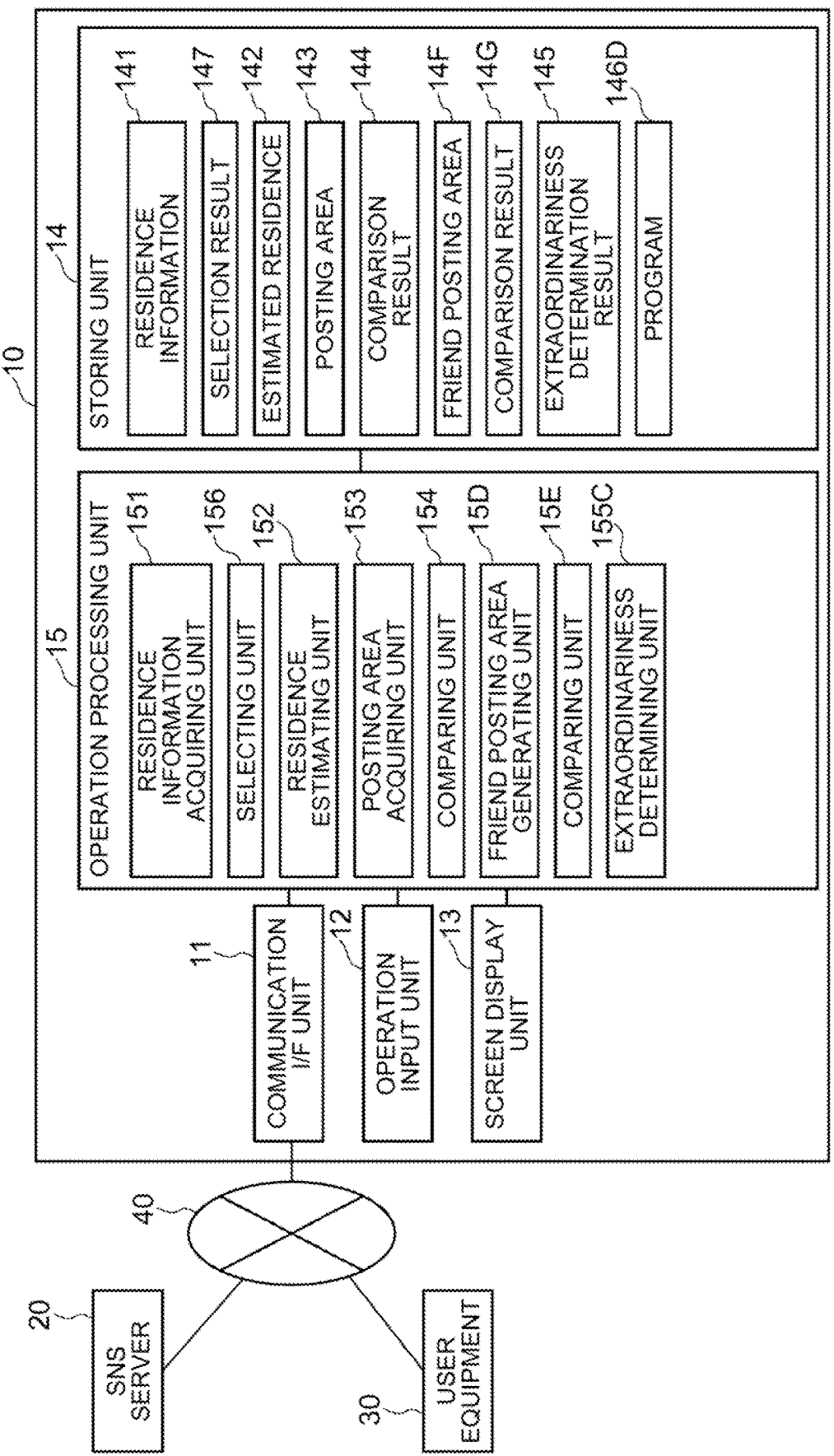
FIG. 11 is a block diagram of a posting location ordinariness/extraordinariness determination system according to a fifth example embodiment of the present invention.

FIG. 11 is a block diagram of the posting location ordinariness/extraordinariness determination system 5, and the same reference numerals as in FIG. 5 denote the same parts. The posting location ordinariness/extraordinariness determination system 5 is different from the posting location ordinariness/extraordinariness determination system 2 shown in FIG. 5 in including a friend posting area 14F, a comparison result 14G, a program 146D, a friend posting area generating unit 15D and an extraordinariness determining unit 155C, and is otherwise the same.

The friend posting area 14F is information on an area of a related user's posting area generated based on an area where the related user has posted content on the social media. The friend posting area 14F may be, for example, information that specifies a posting area at a granularity level corresponding to an administrative division unit such as a prefecture or a municipality. Alternatively, the friend posting area 14F may be, for example, information that includes the latitudes and longitudes of the north, south, east and west end points of the posting area. Moreover, the friend posting area 14F may be an area obtained by taking the logical sum of the posting areas of the respective related users of the target user, or may be an area obtained by taking the logical product. Alternatively, the friend posting area 14F may be an area obtained by taking the logical sum or logical product of the posting areas of n related users with the highest number of posts.

The comparison result 14G is information representing the result of geographically comparing the posting area 143 with the friend posting area 14F. The comparison result 14G may be, for example, information representing whether the posting area 143 is inside the friend posting area 14F or outside the friend posting area 14F.

The program 146D is configured to cause the operation processing unit 15 to function as the residence information acquiring unit 151, the selecting unit 156, the residence estimating unit 152A, the posting area acquiring unit 153, the comparing unit 154, the friend posting area generating unit 15D, a comparing unit 15E, and the extraordinariness determining unit 155C.

The friend posting area generating unit 15D acquires a related user's post from the SNS server 20 through the communication I/F unit 11, and further acquires an area of the acquired post. Moreover, the friend posting area generating unit 15D is configured to, based on the acquired related user's posting area, determine an area of the related user's posting area, and store the friend posting area 14F into the storing unit 14. In a case where the friend posting area generating unit 15D cannot generate a significant friend posting area for a reason such that the number of posts is small, the friend posting area generating unit 15D sets the friend posting area 14F to null.

The comparing unit 15E is configured to geographically compare the friend posting area 14F and the posting area 143 stored in the storing unit 14, and store the comparison result 14G into the storing unit 14.

The extraordinariness determining unit 155C is configured to, based on the comparison result 144 and the comparison result 14G, determine the ordinariness/extraordinariness of the posting area 143, and store the extraordinariness determination result 145 into the storing unit 14.

For example, in a case where the comparison result 144 indicates that the posting area 143 is outside the estimated residence 142, when the comparison result 14G is a null value, the extraordinariness determining unit 155C determines that the posting area 143 is an extraordinary area for the target user. In a case where the comparison result 14G is not a null value, when the comparison result 14G indicates that the posting area 143 is inside the friend posting area 14F, the extraordinariness determining unit 155C determines that the posting area 143 is inside an ordinary activity area of the target user. The reason is that an area where the related user posts is an activity area of the related user and an activity area of the related user is considered to be an activity area of the target user who has some kind of connection with the related user. On the other hand, in a case where the comparison result 14G indicates that the posting area 143 is outside the friend posting area 14F, the extraordinariness determining unit 155C determines that the posting area 143 is an extraordinary activity area for the target user.

Further, in a case where the posting area 143 indicates that the posting area 143 is inside the estimated residence 142, the extraordinariness determining unit 155C determines that the posting area 143 is an ordinary area for the target user regardless of the comparison result 14G.

Next, an operation of the information processing apparatus 10 in the posting location ordinariness/extraordinariness determination system 5 will be described.

Figure 12:
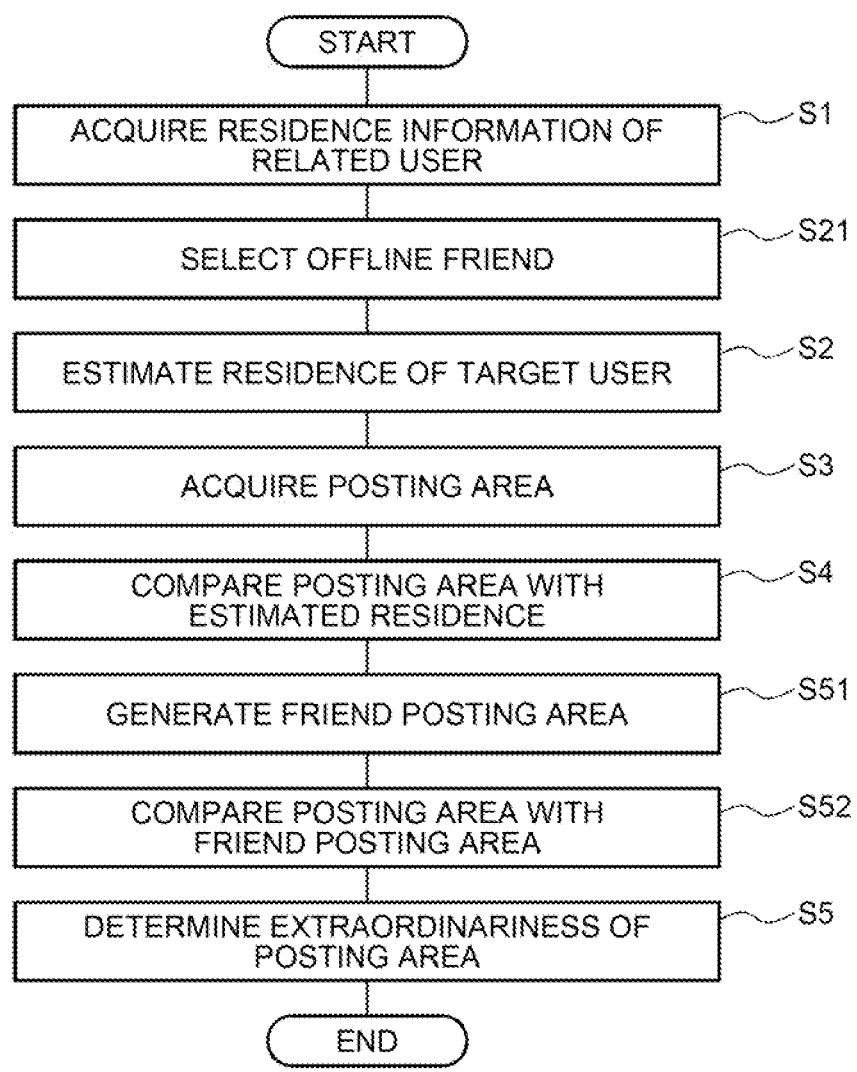
FIG. 12 is a flowchart showing an example of an operation of an information processing apparatus in the posting location ordinariness/extraordinariness determination system according to the fifth example embodiment of the present invention.

FIG. 12 is a flowchart showing an example of the operation of the information processing apparatus 10. Referring to FIG. 12, first, the same operation at steps S1, S21, S2 to S4 as in FIG. 6 is performed. Next, the friend posting area generating unit 15D acquires the posting area of the related user, generates the posting area of the related user from the acquired area, and stores the friend posting area 14F into the storing unit 14 (step S51). Next, the comparing unit 15E geographically compares the posting area 143 with the friend posting area 14F, and stores the comparison result 14G into the storing unit 14 (step S52). Next, the extraordinariness determining unit 155C determines the ordinariness/extraordinariness of the posting area 143 based on the comparison result 144 and the comparison result 14G (step S5).

Thus, according to this example embodiment, the same effect as in the second example embodiment can be obtained and, since the determination is performed in consideration of the posting area of a user related to the target user, it is possible to more precisely determines the ordinariness/extraordinariness of the posting area.

Sixth Example Embodiment

Figure 13:
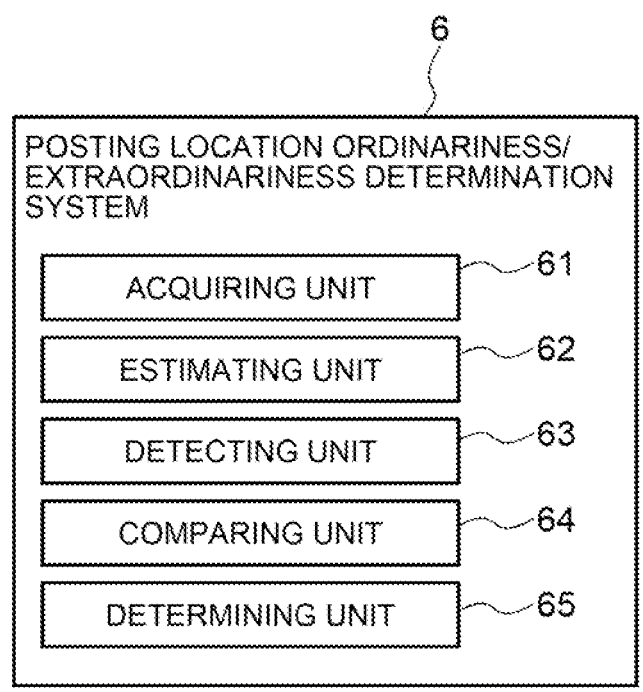
FIG. 13 is a block diagram of a posting location ordinariness/extraordinariness determination system according to a sixth example embodiment of the present invention.

Next, a sixth example embodiment of the present invention will be described with reference to the drawings. FIG. 13 is a block diagram of a posting location ordinariness/extraordinariness determination system 6 in this example embodiment. In this example embodiment, the outline of the abovementioned posting location ordinariness/extraordinariness determination system 6 will be described.

Referring to FIG. 13, the posting location ordinariness/extraordinariness determination system 6 includes an acquiring unit 61, an estimating unit 62, a detecting unit 63, a comparing unit 64, and a determining unit 65.

The acquiring unit 61 is configured to acquire information of a residence of one or more second users having second social media accounts related to a first user having a first social media account. The acquiring unit 61 can be configured, for example, in the same manner as the residence information acquiring unit 151 shown in FIG. 1, but is not limited thereto.

The estimating unit 62 is configured to estimate a residence of the first user based on the information of the residence of the second user. The estimating unit 62 can be configured, for example, in the same manner as the residence estimating unit 152 shown in FIG. 1, but is not limited thereto.

The detecting unit 63 is configured to detect a posting area at which the first user has posted on social media. The detecting unit 63 can be configured, for example, in the same manner as the posting area acquiring unit 153 shown in FIG. 1, but is not limited thereto.

The comparing unit 64 is configured to compare the posting area detected by the detecting unit 63 with the residence of the first user estimated by the estimating unit 62. The comparing unit 64 can be configured, for example, in the same manner as the comparing unit 154 shown in FIG. 1, but is not limited thereto.

The extraordinariness determining unit 155 is configured to determine whether the posting area detected by the detecting unit 63 is an ordinary activity area or an extraordinary activity area for the first user based on a result of the comparison by the comparing unit 64.

The posting location ordinariness/extraordinariness determination system 6 thus configured operates in the following manner. That is to say, first, the acquiring unit 61 acquires information of a residence of one or more second users having second social media accounts related to a first user having a first social media account. Next, the estimating unit 62 estimates a residence of the first user based on the information of the residence of the second user acquired by the acquiring unit 61. Next, the detecting unit 63 detects a posting area at which the first user has posted on social media. Next, the comparing unit 64 compares the posting area detected by the detecting unit 63 with the residence of the first user estimated by the estimating unit 62. Next, the extraordinariness determining unit 155 determines whether the posting area detected by the detecting unit 63 is an ordinary activity area or an extraordinary activity area for the first user based on a result of the comparison by the comparing unit 64.

Thus, the posting location ordinariness/extraordinariness determination system 6 according to this example embodiment can determine whether an area at which the first user has posted is an ordinary activity area or an extraordinary activity area for the first user even if the first user is a user who does not post many in his/her daily life. The reason is that the posting location ordinariness/extraordinariness determination system 6 acquires the residence information of the second user who has some kind of connection with the first user on the social media, estimates the residence of the first user based on the residence information of the second user, and determine the ordinariness/extraordinariness of the posting area based on the result of comparing the posting area of the first user with the estimated residence.

Although the present invention has been described above with reference to the example embodiments, the present invention is not limited to the above example embodiments. The configurations and details of the present invention can be changed in various manners that can be understood by one skilled in the art within the scope of the present invention.

The present invention can be widely used as a technique for determining whether a posting area of content posted on social media such as Twitter, Facebook, YouTube and Instagram is an ordinary activity area or an extraordinary activity area for the user.

The whole or part of the example embodiments disclosed above can be described as, but not limited to, the following supplementary notes.

[Supplementary Note 1]

A posting location ordinariness/extraordinariness determination system comprising:

a first acquiring unit configured to acquire information of a residence of one or more second users each having a second social media account related to a first user having a first social media account;

an estimating unit configured to estimate a residence of the first user from the information of the residence of the second user;

a detecting unit configured to detect a posting area at which the first user has posted on social media;

a first comparing unit configured to compare the posting area with the residence of the first user; and a first determining unit configured to determine whether the posting area is an ordinary activity area or an extraordinary activity area for the first user based on a result of the comparison.

[Supplementary Note 2]

The posting location ordinariness/extraordinariness determination system according to Supplementary Note 1, further comprising a selecting unit configured to select as a third user the second user interacting with the first user in a real space from among the one or more second users, wherein the estimating unit is configured to estimate the residence of the first user from information of a residence of the third user.

[Supplementary Note 3]

The posting location ordinariness/extraordinariness determination system according to Supplementary Note 2, wherein the selecting unit is configured to select as the third user the second user having the second social media account that is a local account related to a specific region from among the one or more second users.

[Supplementary Note 4]

The posting location ordinariness/extraordinariness determination system according to Supplementary Note 2, wherein the selecting unit is configured to classify the one or more second users into one or more clusters based on proximity of the residences, and select as the third user the second user belonging to the cluster satisfying a predetermined number of constituents.

[Supplementary Note 5]

The posting location ordinariness/extraordinariness determination system according to Supplementary Note 2, wherein the selecting unit is configured to select as the third user the second user whose average or median value of movement distances calculated based on a movement history is equal to or less than a threshold value from among the one or more second users.

[Supplementary Note 6]

The posting location ordinariness/extraordinariness determination system according to any of Supplementary Notes 1 to 5, further comprising:

a second acquiring unit configured to acquire an attribute of the posting area;

a third acquiring unit configured to acquire an attribute of the first user; and a second determining unit configured to determine a relation between the attribute of the area and the attribute of the first user, wherein the first determining unit is configured to determine whether the posting area is an ordinary activity area or an extraordinary activity area for the first user based on the result of the comparison by the first comparing unit and a result of the determination by the second determining unit.

[Supplementary Note 7]

The posting location ordinariness/extraordinariness determination system according to any of Supplementary Notes 1 to 5, further comprising:

a second acquiring unit configured to acquire an attribute of the posting area;

a third acquiring unit configured to acquire a schedule of the first user at time and date of the posting; and a second determining unit configured to determine ordinariness of an action for the first user to go to the posting area from the attribute of the area and the acquired schedule, wherein the first determining unit is configured to determine whether the posting area is an ordinary activity area or an extraordinary activity area for the first user based on the result of the comparison by the first comparing unit and a result of the determination by the second determining unit.

[Supplementary Note 8]

The posting location ordinariness/extraordinariness determination system according to any of Supplementary Notes 1 to 5, further comprising:

a generating unit configured to generate an action area in a real space of the second user based on a posting location of the second user; and a second comparing unit configured to compare the posting area with the action area, wherein the first determining unit is configured to determine whether the posting area is an ordinary activity area or an extraordinary activity area for the first user based on the result of the comparison by the first comparing unit and a result of the comparison by the second comparing unit.

[Supplementary Note 9]

A posting location ordinariness/extraordinariness determination method comprising:

acquiring information of a residence of one or more second users each having a second social media account related to a first user having a first social media account;

estimating a residence of the first user from the information of the residence of the second user;

detecting a posting area at which the first user has posted on social media;

comparing the posting area with the residence of the first user; and determining whether the posting area is an ordinary activity area or an extraordinary activity area for the first user based on a result of the comparison.

[Supplementary Note 10]

10. A non-transitory computer-readable recording medium on which a computer program is recorded, the computer program comprising instructions for causing a computer to execute processes to:

acquire information of a residence of one or more second users each having a second social media account related to a first user having a first social media account;

estimate a residence of the first user from the information of the residence of the second user;

detect a posting area at which the first user has posted on social media;

compare the posting area with the residence of the first user; and determine whether the posting area is an ordinary activity area or an extraordinary activity area for the first user based on a result of the comparison.

DESCRIPTION OF NUMERALS 1-6 posting location ordinariness/extraordinariness determination system
10 information processing apparatus
11 communication I/F unit
12 operation input unit
13 screen display unit
14 storing unit
15 operation processing unit

What is claimed is:

1. A posting location determination apparatus comprising:
a memory containing program instructions; and
a processor coupled to the memory, wherein the processor is configured to execute the program instructions to:
acquire information of a residence of one or more second users each having a second social media account related to a first user having a first social media account;
estimate a residence of the first user from the information of the residence of the second user;
detect a posting area at which the first user has posted on social media;
compare the posting area with the residence of the first user; and
determine whether the posting area is an ordinary activity area or an extraordinary activity area for the first user based on a result of the comparison.

2. The posting location determination apparatus according to claim 1, wherein the processor is further configured to execute the instructions to:
select as a third user the second user interacting with the first user in a real space from among the one or more second users; and
in the estimation, estimate the residence of the first user from information of a residence of the third user.

3. The posting location determination apparatus according to claim 2, wherein the processor is further configured to execute the instructions to
in the selection, select as the third user the second user having the second social media account that is a local account related to a specific region from among the one or more second users.

4. The posting location determination apparatus according to claim 2, wherein the processor is further configured to execute the instructions to
in the selection, classify the one or more second users into one or more clusters based on proximity of the residences, and select as the third user the second user belonging to the cluster satisfying a predetermined number of constituents.

5. The posting location determination apparatus according to claim 2, wherein the processor is further configured to execute the instructions to
in the selection, select as the third user the second user whose average or median value of movement distances calculated based on a movement history is equal to or less than a threshold value from among the one or more second users.

6. The posting location determination apparatus according to claim 1, wherein the processor is further configured to execute the instructions to:
acquire an attribute of the posting area;
acquire an attribute of the first user;
determine a relation between the attribute of the area and the attribute of the first user; and
in the determination whether the posting area is an ordinary activity area or an extraordinary activity area for the first user, determine whether the posting area is an ordinary activity area or an extraordinary activity area for the first user based on the result of the comparison between the posting area and the residence of the first user and a result of the determination of the relation between the attribute of the area and the attribute of the first user.

7. The posting location determination apparatus according to claim 1, wherein the processor is further configured to execute the instructions to:
acquire an attribute of the posting area;
acquire a schedule of the first user at time and date of the posting;
determine ordinariness of an action for the first user to go to the posting area from the attribute of the area and the acquired schedule; and
in the determination whether the posting area is an ordinary activity area or an extraordinary activity area for the first user, determine whether the posting area is an ordinary activity area or an extraordinary activity area for the first user based on the result of the comparison between the posting area and the residence of the first user and a result of the determination of the ordinariness of the action for the first user to go to the posting area.

8. The posting location determination apparatus according to claim 1, wherein the processor is configured to execute the instructions to:
generate an action area in a real space of the second user based on a posting location of the second user;
compare the posting area with the action area; and
in the determination whether the posting area is an ordinary activity area or an extraordinary activity area for the first user, determine whether the posting area is an ordinary activity area or an extraordinary activity area for the first user based on the result of the comparison between the posting area and the residence of the first user and a result of the comparison between the posting area and the action area.

9. A posting location determination method comprising:
acquiring information of a residence of one or more second users each having a second social media account related to a first user having a first social media account;
estimating a residence of the first user from the information of the residence of the second user;
detecting a posting area at which the first user has posted on social media;
comparing the posting area with the residence of the first user; and
determining whether the posting area is an ordinary activity area or an extraordinary activity area for the first user based on a result of the comparison.

10. A non-transitory computer-readable recording medium on which a computer program is recorded, the computer program comprising instructions for causing a computer to execute processes to:
acquire information of a residence of one or more second users each having a second social media account related to a first user having a first social media account;
estimate a residence of the first user from the information of the residence of the second user;
detect a posting area at which the first user has posted on social media;

compare the posting area with the residence of the first user; and determine whether the posting area is an ordinary activity area or an extraordinary activity area for the first user based on a result of the comparison.

* * * * *